US012297842B2

(12) United States Patent
Nowak et al.

(10) Patent No.: US 12,297,842 B2
(45) Date of Patent: May 13, 2025

(54) SUPPLYING A MIXTURE OF AIR AND EXHAUST GAS TO A COMPRESSOR WHEEL OF A COMPRESSOR

(71) Applicant: MITSUBISHI HEAVY INDUSTRIES ENGINE & TURBOCHARGER, LTD., Sagamihara (JP)

(72) Inventors: Tim Nowak, Almere (NL); Alef Brandenburgh, Almere (NL); Mirko Sitter, Almere (NL)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/283,960

(22) PCT Filed: Apr. 9, 2021

(86) PCT No.: PCT/IB2021/052944
§ 371 (c)(1),
(2) Date: Sep. 25, 2023

(87) PCT Pub. No.: WO2022/214852
PCT Pub. Date: Oct. 13, 2022

(65) Prior Publication Data
US 2024/0159242 A1 May 16, 2024

(51) Int. Cl.
F04D 29/42 (2006.01)
F02C 3/04 (2006.01)
(Continued)

(52) U.S. Cl.
CPC ............ *F04D 29/4213* (2013.01); *F02C 3/04* (2013.01); *F02M 26/04* (2016.02); *F02M 26/09* (2016.02); *F02M 26/21* (2016.02); *F04D 17/10* (2013.01)

(58) Field of Classification Search
CPC ........ F02M 26/06; F02M 26/09; F02M 26/19; F02M 26/21; F04D 29/4213; F04D 29/684
See application file for complete search history.

(56) References Cited

U.S. PATENT DOCUMENTS 7,624,575 B2 * 12/2009 Noelle .................. F02M 26/12
60/605.1
7,698,894 B2 * 4/2010 Wood ...................... F02B 37/22
415/57.4
(Continued)

FOREIGN PATENT DOCUMENTS

DE  10 2014 225 716 A1  7/2015
DE  10 2014 216 163 A1  2/2016
(Continued)

OTHER PUBLICATIONS

International Search Report (PCT/ISA/210) issued in PCT/IB2021/052944 mailed on Jan. 3, 2022.
Written Opinion (PCT/ISA/237) issued in PCT/IB2021/052944 mailed on Jan. 3, 2022.

*Primary Examiner* — Christopher R Legendre
(74) *Attorney, Agent, or Firm* — Birch, Stewart, Kolasch & Birch, LLP

(57) ABSTRACT

In the technical field of compressors, a system that is configured to supply a mixture of air and exhaust gas to a compressor wheel of a compressor is provided. The system comprises a main channel that is configured to debouch into an area where the compressor wheel is located at an outlet end thereof, to receive a supply of air in a first section thereof, and to receive a supply of exhaust gas further downstream in a second section thereof, and an exhaust gas supply arrangement that is connected to the main channel at the position of the second section. The exhaust gas supply arrangement is designed as a distributor comprising at least (Continued)

two exhaust gas supply channels which are separate from each other along at least a substantial part of their length.

20 Claims, 5 Drawing Sheets

(51) Int. Cl.
  *F02M 26/04* (2016.01)
  *F02M 26/09* (2016.01)
  *F02M 26/21* (2016.01)
  *F04D 17/10* (2006.01)

(56) References Cited

U.S. PATENT DOCUMENTS

| | | | | |
|---|---|---|---|---|
| 7,971,579 | B2 * | 7/2011 | Heald | F02M 26/19 |
| | | | | 123/568.17 |
| 9,003,791 | B2 * | 4/2015 | Ibaraki | F04D 29/681 |
| | | | | 415/58.4 |
| 9,670,881 | B2 * | 6/2017 | Shioda | F04D 29/5846 |
| 9,828,922 | B2 * | 11/2017 | Kemmerling | F02M 26/07 |
| 2007/0036662 | A1 | 2/2007 | Pesola et al. | |
| 2018/0230850 | A1 | 8/2018 | Karstadt et al. | |
| 2024/0159242 | A1 * | 5/2024 | Nowak | F02M 26/21 |

FOREIGN PATENT DOCUMENTS

| | | |
|---|---|---|
| EP | 1 749 992 A1 | 2/2007 |
| EP | 3 067 547 A1 | 9/2016 |
| WO | WO 2018/078296 A2 | 5/2018 |

\* cited by examiner

SUPPLYING A MIXTURE OF AIR AND EXHAUST GAS TO A COMPRESSOR WHEEL OF A COMPRESSOR

FIELD OF THE INVENTION

In the first place, the present invention relates to a system configured to supply a mixture of air and exhaust gas to a compressor wheel of a compressor, the system comprising: a main channel that is configured to debouch into an area where the compressor wheel is located at an outlet end thereof, to receive a supply of air in a first section thereof, and to receive a supply of exhaust gas in a second section thereof that is closer to the outlet end than the first section, and an exhaust gas supply arrangement that is connected to the main channel at the position of the second section.

In the second place, the present invention relates to an assembly of a turbocharger and a system as described here before.

In the third place, the present invention relates to an exhaust gas supply arrangement configured to be used in a system that is configured to supply a mixture of air and exhaust gas to a compressor wheel of a compressor.

In the fourth place, the present invention relates to a method of supplying a mixture of air and exhaust gas to a compressor wheel of a compressor, the method comprising: providing an air flow and directing the air flow towards an area where the compressor wheel is located, and providing exhaust gas and injecting the exhaust gas in the air flow at an injection position on the air flow.

In the fifth place, the present invention relates to a method of manufacturing a system configured to supply a mixture of air and exhaust gas to a compressor wheel of a compressor, the method comprising: providing a main channel and arranging the main channel to debouch into an area where the compressor wheel is located at an outlet end thereof, and providing an exhaust gas supply arrangement and connecting the exhaust gas supply arrangement to the main channel.

BACKGROUND OF THE INVENTION

A well-known example of a field in which compressors are applied is the field of turbochargers. Turbochargers are used for the purpose of supplying air to the intake of an internal combustion engine at pressures above atmospheric (boost pressures). In general, a turbocharger comprises a turbine wheel that is arranged and configured to be driven by an exhaust gas flow of the engine. The turbine wheel is mounted on a rotatable shaft and is accommodated by a turbine housing. A compressor wheel is mounted on the other end of the shaft and is accommodated by a compressor housing. Hence, the compressor wheel is arranged to rotate along with the turbine wheel. The compressor wheel serves to deliver compressed air to the engine intake manifold.

During operation of the turbocharger, an exhaust gas flow of an engine is introduced into the turbine housing through the inlet of the turbine housing and flows towards the turbine wheel via the at least one scroll-shaped volute. The turbine wheel is configured to be rotated under the influence of the exhaust gas flow and to thereby also cause rotation of the shaft and the compressor wheel. In this way, the compressor wheel is enabled to realize the functionality of the turbocharger as envisaged, i.e. the functionality of compressing air to be supplied to the engine. Alternative ways of driving a compressor wheel of a compressor in general comprise driving the compressor wheel by an electric motor and driving the compressor wheel through coupling to an internal combustion engine.

In the technical field of turbochargers, low-pressure exhaust gas recirculation, commonly abbreviated to LP-EGR, is known. This is an exhaust gas recirculation configuration in which exhaust gas is taken downstream of the turbocharger's turbine, and then introduced upstream of the turbocharger's compressor in an air flow towards the compressor, in an area known as the mixing area. A widely applied mixing design of the exhaust gas from an LP-EGR system with the air involves a T-junction. According to an insight of the present invention, a non-uniform flow field is obtained in this design, caused by the T-junction configuration, which brings about a drop in compressor performance. In particular, the mixing has an effect on the compressor pressure ratio, compressor efficiency and condensation of water. In respect of the condensation of water, it is noted that this may be disadvantageous as the water can cause erosion of the blades of the compressor wheel due to impact of water droplets on the blades.

SUMMARY OF THE INVENTION

It is an objective of the present invention to alleviate the above-mentioned problematic effects of the conventional T-junction configuration. In a general sense, it is an objective of the present invention to reduce the effect of the mixing of exhaust gas with fresh air that is supplied to a compressor wheel on compressor performance while also keeping the impact of condensation on an acceptable low level.

Aspects of the present invention are set out in the accompanying independent and dependent claims. Features from the dependent claims may be combined with features from the respective independent claims as appropriate and not merely as explicitly set out in the claims and explained in the following description.

In view of the foregoing, the present invention provides a system configured to supply a mixture of air and exhaust gas to a compressor wheel of a compressor, the system comprising: a main channel that is configured to debouch into an area where the compressor wheel is located at an outlet end thereof, to receive a supply of air in a first section thereof, and to receive a supply of exhaust gas in a second section thereof that is closer to the outlet end than the first section, and an exhaust gas supply arrangement that is connected to the main channel at the position of the second section, wherein the exhaust gas supply arrangement is designed as a distributor comprising at least two exhaust gas supply channels which are separate from each other along at least a substantial part of their length.

It follows from the above general definition of the system according to the present invention that the invention provides a configuration of the system that enables injecting the exhaust gas in the air flow in a multiple discrete and circumferentially distributed way. In the context of the present invention, this can be done without a need for applying complex constructional measures such as arranging a ported shroud or a swirl generating chamber around the main channel at the injection position, due to the particular configuration with the exhaust gas supply channels which are separate from each other along at least a substantial part of their length. By splitting up from a single discrete to multiple supply lines of exhaust gas, it is achieved that in comparison to conventional situations, less reduction of compressor performance takes place. It is beneficial to the distribution effect of the measure according to the present invention if the exhaust gas supply channels extend towards different peripheral positions on the main channel.

In a practical embodiment, the exhaust gas supply arrangement comprises a central inlet channel that is configured to receive a supply of exhaust gas at a position upstream of the exhaust gas supply channels, and the exhaust gas supply channels are arranged to extend from the central inlet channel. Further, in the context of the present invention, it is practical if the exhaust gas supply arrangement is connected to the main channel at ends of the exhaust gas supply channels. In such a case, it may be so that each of the exhaust gas supply channels debouches directly into the main channel and thereby enables direct injection of an exhaust gas flow in air flowing through the main channel towards the outlet end thereof without first mixing with an exhaust gas flow of any other exhaust gas supply channel during operation of the system. Such configuration can easily be realized on the basis of the application of the exhaust gas supply channels which are separate from each other along at least a substantial part of their length, wherein it may be practical that the exhaust gas supply channels are separate from each other along their entire length.

In the context of the present invention, a possible further measure for reducing the effect of the injection of the exhaust gas in the air on compressor performance while keeping the impact of condensation on an acceptable low level involves a configuration in which each of the exhaust gas supply channels is connected to the main channel with axial inclination and/or without circumferential inclination. This allows the introduction of the respective exhaust gas flows in the air flow to be as smooth as possible, whereby uniformity of the flow further downstream is promoted.

The present invention covers an option of the exhaust gas supply channels being connected to the main channel at a single axial position on the main channel. This may be advantageous both from the perspective of reducing flow disturbances in the main channel and the perspective of manufacturability of the system.

In an advantageous embodiment of the system according to the present invention, each of the exhaust gas supply channels comprises a section of which the cross-section decreases in flow direction. On the basis of this design of the exhaust gas supply channels, it is possible to achieve acceleration of the exhaust gas flow and to thereby further support the injection of the exhaust gas flow in the air flow. In respect of the position of the section of which the cross-section decreases in flow direction, various options are applicable, including an option of the section being at a position of an end of the exhaust gas supply channels at the side of the main channel.

It is noted that when it comes to the use of the term "channel" in the context of the present text, there is no implicit link to any particular cross-sectional shape of the flow path defined by the channel. By no means does the cross-sectional shape need to be circular, although this can be an option. The indication that the exhaust gas supply channels are separate from each other along at least a substantial part of their length is to be understood such as to imply that flows through the channels are separate from each other along at least a substantial part of the length of the channels, wherein it may be so that space is actually present between the channels or that the channels are in a configuration in which they extend alongside each other.

In respect of the cross-sectional shape of the exhaust gas supply channels, it is noted that it may be practical if the exhaust gas supply channels have a flattened cross-sectional shape, along at least a part of their length, preferably at least in end sections at the side of the main channel. This may be a way of achieving that the exhaust gas enters less deep in the air flow and stays more to the periphery of the main channel, so that less disturbance of the air flow takes place and pressure and velocity losses in the zone where air and exhaust gas mix which otherwise would occur much stronger are reduced. Furthermore, due to the flat shape of the zone where air and exhaust gas mix, condensation is reduced compared to a shape on the basis of which the exhaust gas would be injected deeply in the air flow and would cause stronger mixing.

In a feasible embodiment of the system according to the present invention, the cross-section of the main channel decreases as seen in flow direction in an area of the main channel where the exhaust gas supply arrangement is connected to the main channel. Alternatively, the cross-section of the main channel decreases as seen in flow direction in an area of the main channel that is upstream of the position where the exhaust gas supply arrangement is connected to the main channel. In the first case, the system is configured to enable the injection of the exhaust gas in the air flow and contraction of the mixture of the exhaust gas and the air thus obtained to take place simultaneously. In the second case, the system is configured to first realize contraction of air and to then realize the injection of the exhaust gas in the air flow. It is also possible that the cross-section of the main channel decreases as seen in flow direction in an area of the main channel that is downstream of the position where the exhaust gas supply arrangement is connected to the main channel.

When a comparison is made of the prior art and options covered by the present invention, it is found that by splitting up from a single discrete to multiple circumferentially located discrete injection positions, possibly in combination with an incorporation of flow contraction, the wake flow impact is reduced. This will result in less pressure ratio and efficiency loss of the compressor. However, it may be so that the overall mixing surface is increased. A position of the injection closer to the compressor wheel reduces the mixing length and the risk of condensation and thereby the risk of severe damage to the compressor wheel.

From a manufacturing point of view, it may be advantageous if the main channel is composed of at least two separate parts joined together. For example, one of the parts may be provided with inlet openings at positions where the exhaust gas supply arrangement is to be connected, and another of the parts may include a fluid contracting section, i.e. a section where the cross-section of the main channel decreases as seen in flow direction.

It is known in the field of turbochargers that a compressor can be provided with a bypass valve channel for recirculation air, wherein a cross-sectional shape of the flow path defined by the bypass valve channel does not necessarily need to be circular. In this respect, it is noted that it may be advantageous if the exhaust gas supply arrangement comprises at least one coupling area that is configured to enable coupling of such a bypass valve channel to the exhaust gas supply arrangement, wherein the at least one coupling area may be situated at any appropriate position on the exhaust gas supply arrangement, such as on one of the exhaust gas supply channels. In this configuration, if the bypass valve in the bypass valve channel is opened, air is added to the exhaust gas flowing through the exhaust gas supply arrangement. Operating the bypass valve is expected to yield performance improvement of the compressor. If the bypass valve channel is connected to the exhaust gas supply arrangement, indeed, this may be all the more the case since there is no need for an additional opening in the main flow domain. It is noted that in practice, there is no flow through the bypass valve channel all the time, and that the same is applicable to a supply flow of exhaust gas to the exhaust gas supply arrangement. In view thereof, four different combinations may occur: the exhaust gas supply arrangement receives a) both an incoming flow of exhaust gas and a flow from the bypass valve channel, b) no flows, c) only an incoming flow of exhaust gas, or d) only a flow from the bypass valve channel.

In order to have a compact construction so that space can be saved, and/or to only have a minimum of separate parts, it may be useful if at least a portion of the exhaust gas supply arrangement of the system is integrated in a component configured to be used as cover component of the compressor.

The present invention also relates to an assembly of a turbocharger and the system as defined and described in the foregoing.

Further, the present invention also relates to an exhaust gas supply arrangement. With reference to the above explanation of the basic aspects of the present invention, it is noted that such an exhaust gas supply arrangement is configured to be used in a system that is configured to supply a mixture of air and exhaust gas to a compressor wheel of a compressor, wherein the exhaust gas supply arrangement is designed as a distributor comprising at least two exhaust gas supply channels which are separate from each other along at least a substantial part of their length, and wherein the exhaust gas supply arrangement comprises a single integral piece including the at least two exhaust gas supply channels. As suggested in the foregoing, it is practical if the exhaust gas supply arrangement comprises a central inlet channel, wherein the exhaust gas supply channels are arranged to extend from the central inlet channel. Other aspects of the present invention described in the foregoing are equally applicable to the exhaust gas supply arrangement as such.

In terms of a method, the present invention relates to a method of supplying a mixture of air and exhaust gas to a compressor wheel of a compressor. The method comprises the following: providing an air flow and directing the air flow towards an area where the compressor wheel is located, and providing exhaust gas and injecting the exhaust gas in the air flow at an injection position on the air flow, wherein the exhaust gas is provided in at least two separate exhaust gas flows which are directed towards the injection position on the air flow from different sides of the air flow. As indicated in the foregoing, the present invention covers an option according to which each of the at least two separate exhaust gas flows is injected directly in the air flow without first mixing with any other exhaust gas flow. Further, as indicated in the foregoing, the present invention covers an option according to which the separate exhaust gas flows are obtained by separating a single supply exhaust gas flow.

It can be understood that various further options in respect of the method according to the present invention may relate to a number of the options described in the foregoing in the context of the system according to the present invention, and may involve the same features or combinations of features. Accordingly, the aspects of the earlier discussions and explanations are also applicable when the present invention is expressed in the terms of the method.

The present invention further relates to a method of manufacturing a system configured to supply a mixture of air and exhaust gas to a compressor wheel of a compressor, the method comprising: providing a main channel and arranging the main channel to debouch into an area where the compressor wheel is located at an outlet end thereof, and providing an exhaust gas supply arrangement that is designed as a distributor comprising at least two separate exhaust gas supply channels which are separate from each other along a substantial part of their length, and connecting the exhaust gas supply arrangement to the main channel. Out of many options residing under the general concept of the manufacturing method, the following are mentioned: a) connecting the exhaust gas supply arrangement to the main channel is done at ends of the exhaust gas supply channels, b) the at least two exhaust gas supply channels are connected to the main channel at different peripheral positions on the main channel, and c) providing the main channel comprises providing and joining together at least two separate parts.

BRIEF DESCRIPTION OF THE DRAWINGS

Further features and advantages of the present invention will become apparent from the description of the invention by way of exemplary and non-limiting embodiments of a system configured to supply a mixture of air and exhaust gas to a compressor wheel of a compressor and components of such a system.

The person skilled in the art will appreciate that the described embodiments of the system according to the present invention are exemplary in nature only and not to be construed as limiting the scope of protection defined in the claims in any way. The person skilled in the art will realize that alternatives and equivalent embodiments of the system can be conceived and reduced to practice without departing from the scope of protection of the present invention.

Figure 1:
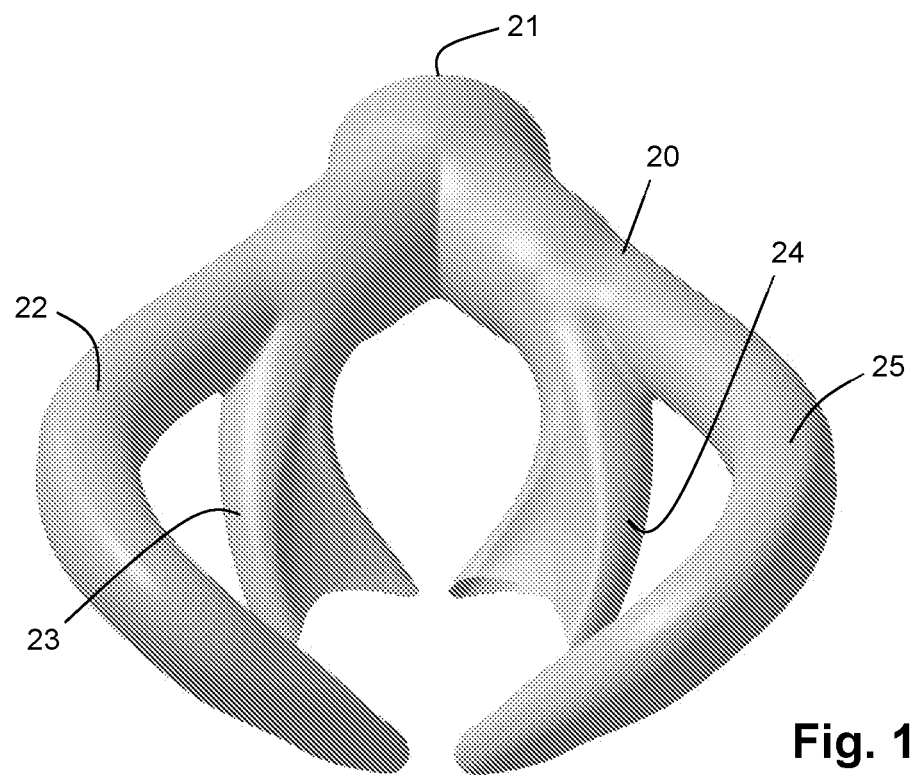
Figure 2:
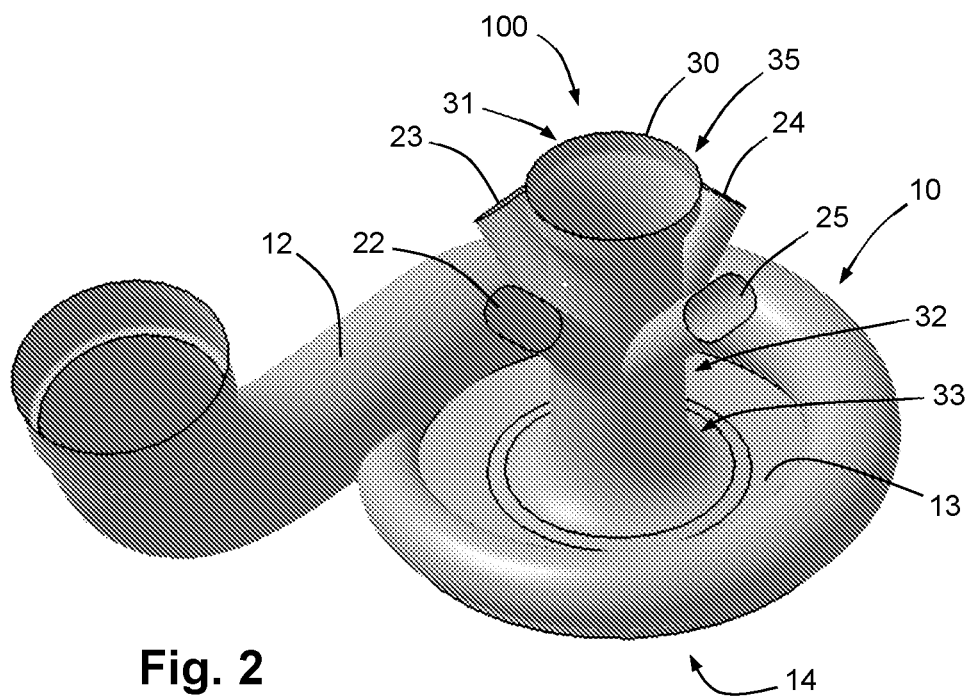
Figure 3:
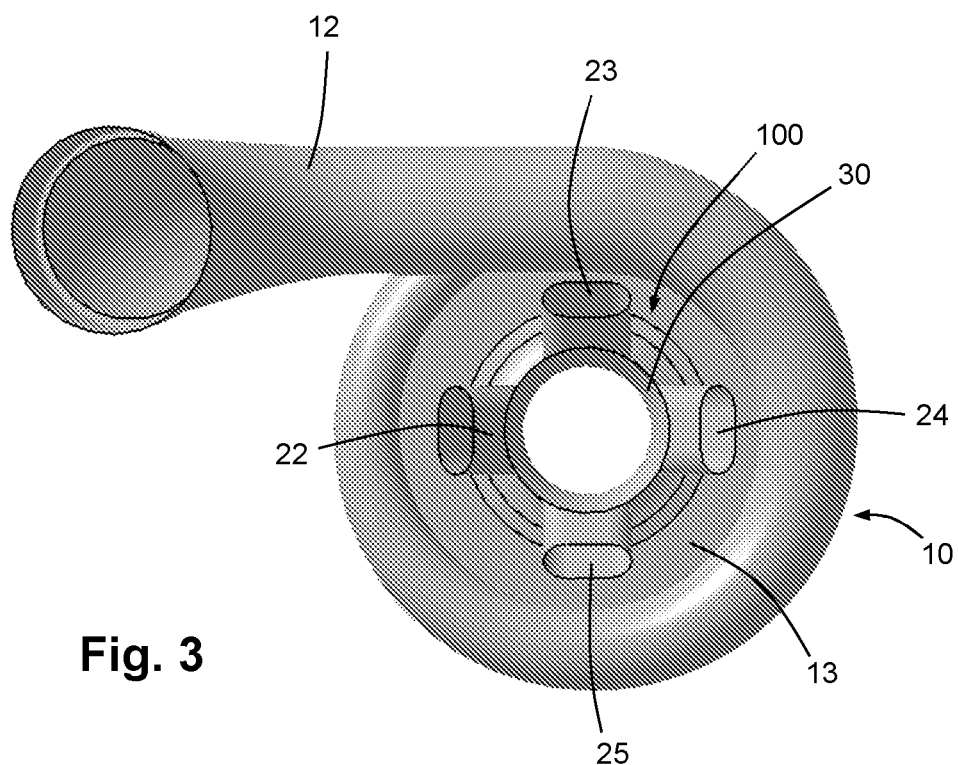
Figure 4:
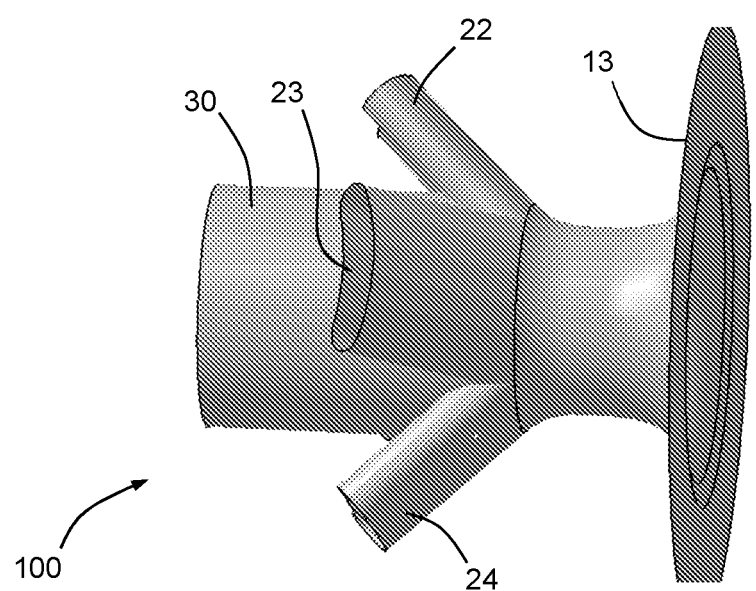
Figure 5:
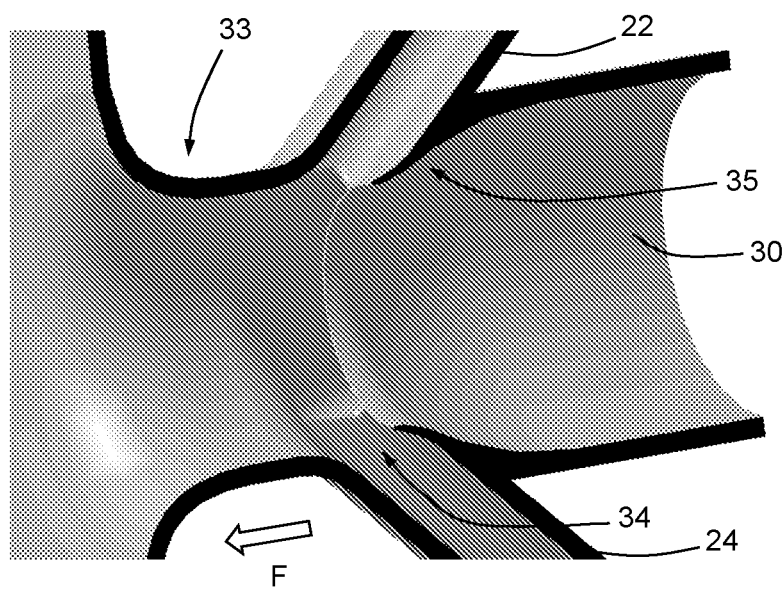
Figure 6:
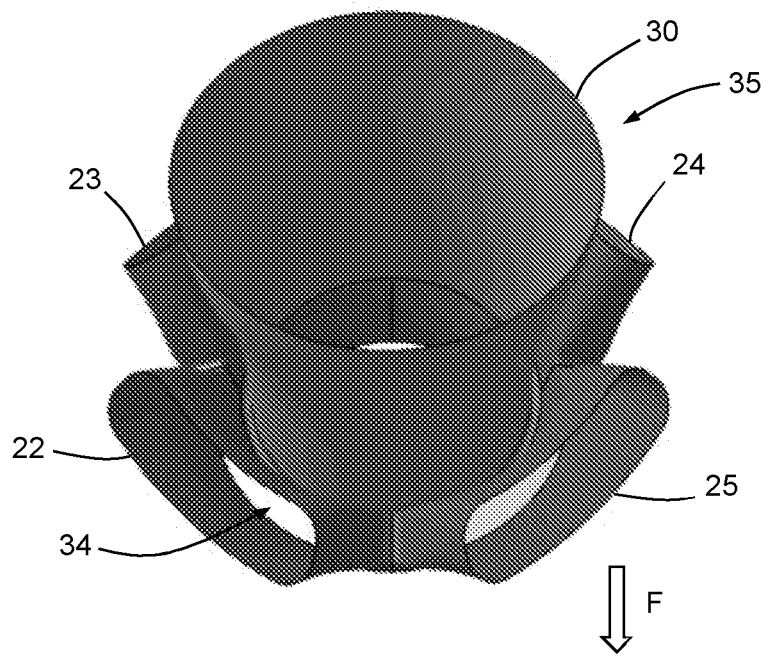
Figure 7:
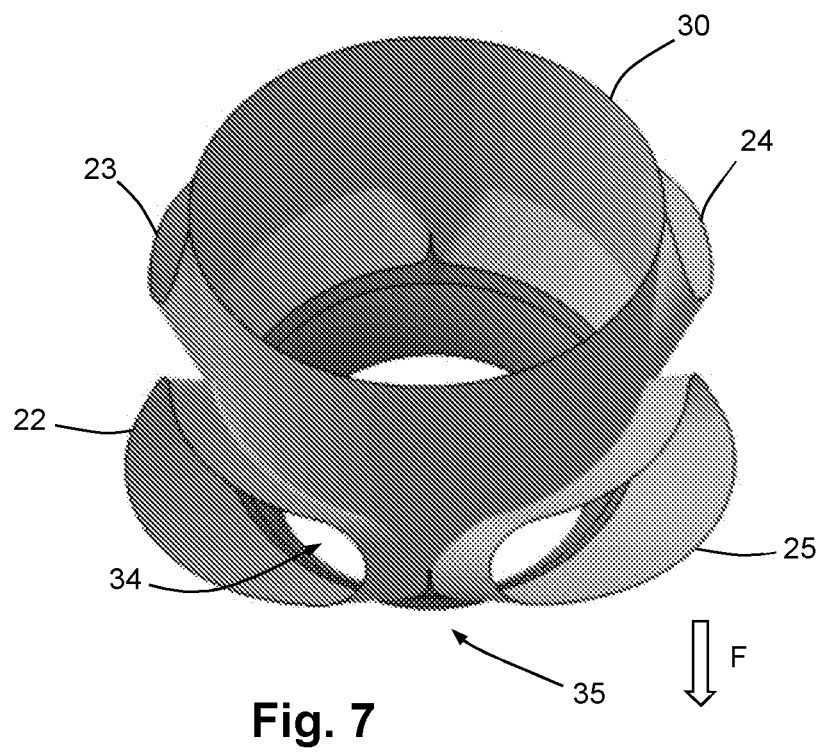
Figure 8:
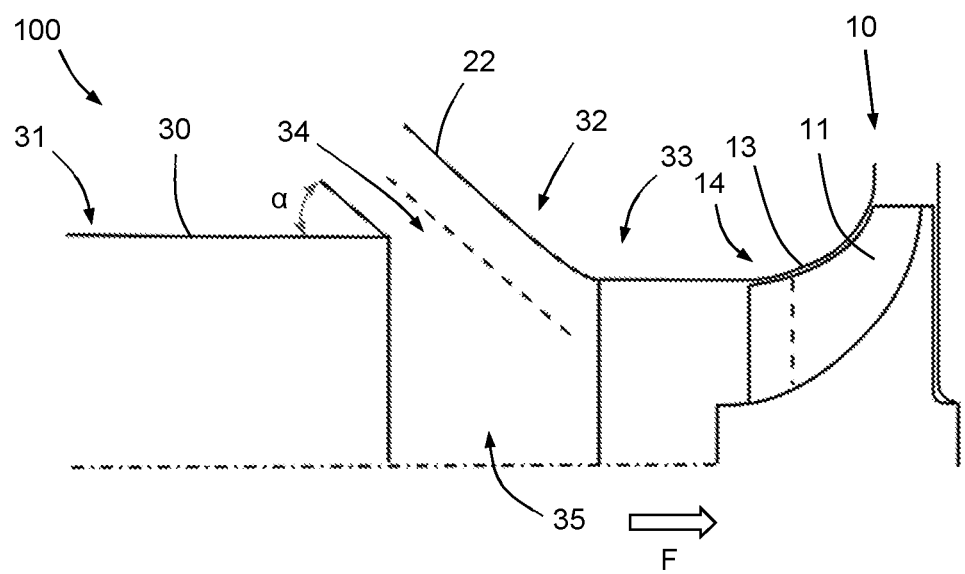
Figure 9:
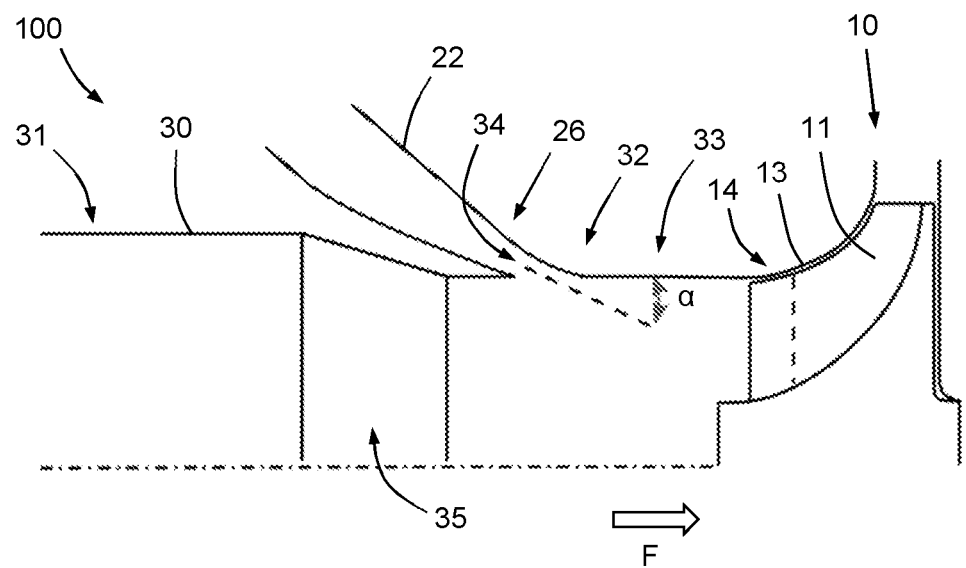
Figure 10:
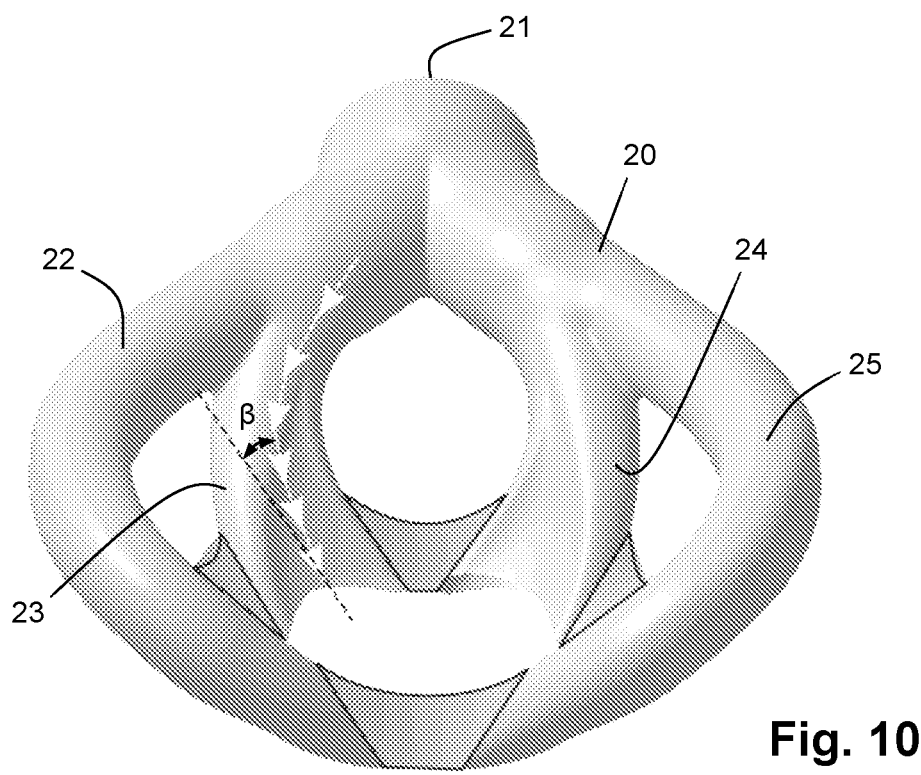

Reference will be made to the figures on the accompanying drawing sheets. The figures are schematic in nature and therefore not necessarily drawn to scale. Further, equal reference numerals denote equal or similar parts. On the attached drawing sheets, FIG. 1 diagrammatically shows a perspective view of an exhaust gas supply arrangement that is part of a system configured to supply a mixture of air and exhaust gas to a compressor wheel of a compressor, and that is connectable to a main channel of the system that is configured to debouch into an area where the compressor wheel is located;

FIGS. 2 and 3 diagrammatically show a perspective view and a top view, respectively, of an assembly of the main channel, end sections of exhaust gas supply channels of the exhaust gas supply arrangement connected to the main channel, and a cover component of the compressor, in an arrangement with an outlet pipe of the compressor;

FIG. 4 diagrammatically shows a perspective view of a portion of the assembly of the main channel, the end sections of the exhaust gas supply channels of the exhaust gas supply arrangement connected to the main channel, and the cover component of the compressor;

FIG. 5 diagrammatically shows a view of a longitudinal section through a portion of the main channel and end sections of the exhaust gas supply channels of the exhaust gas supply arrangement connected to the main channel;

FIGS. 6 and 7 illustrate two optional positions of a fluid contracting section and a section having inlet openings relative to each other in the main channel;

FIGS. 8 and 9 illustrate two options of constructional details of a portion of the system including a section of the main channel and an end section of an exhaust gas supply channel of the exhaust gas supply arrangement connected to the main channel; and FIG. 10 diagrammatically shows a perspective view of an alternative embodiment of the exhaust gas supply arrangement.

DETAILED DESCRIPTION OF EMBODIMENTS

The figures relate to advantageous practical embodiments of a system 100 according to the invention, which system 100 is configured to supply a mixture of air and exhaust gas to a compressor wheel 11 of a compressor 10, and which will hereinafter be referred to as air/gas supply system. The compressor 10 may be part of a turbocharger, for example. The set-up of these practical embodiments is aimed at injecting the exhaust gas in a flow of air in a multiple discrete and circumferentially distributed way in order to obtain beneficial effects of a) reduced mixing of the exhaust gas and the air and b) enhanced uniformity of the flow towards the compressor wheel 11 so that compressor performance is improved compared to the prior art to a considerable extent. Further aspects of the practical embodiments are also chosen so as to contribute to the beneficial effects as mentioned and/or to other beneficial effects, as will be explained later.

The particular set-up of the practical embodiments as mentioned here before is realized by using an exhaust gas supply arrangement 20 designed as a distributor. A practical embodiment of such an exhaust gas supply arrangement 20 is shown in FIG. 1. In this embodiment, the exhaust gas supply arrangement 20 comprises a central inlet channel 21 and four exhaust gas supply channels 22, 23, 24, 25 which are arranged to extend from the central inlet channel 21 like separate branches. The central inlet channel 21 is configured to receive a supply of exhaust gas at a position upstream of the exhaust gas supply channels 22, 23, 24, 25. Having four exhaust gas supply channels 22, 23, 24, 25 in the exhaust gas supply arrangement 20 is practical, but that does not alter the fact that the number of exhaust gas supply channels 22, 23, 24, 25 may be chosen differently. According to a practical option, the supply of exhaust gas is received from an internal combustion engine. An outlet pipe 12 of the compressor 10 is shown in FIGS. 2 and 3.

In the air/gas supply system 100, the exhaust gas supply arrangement 20 is connected to a main channel 30, as can be seen in FIGS. 2 and 3, in which the main channel 30 and end sections of the exhaust gas supply channels 22, 23, 24, 25 are shown. The main channel 30 is configured to debouch into an area 14 where the compressor wheel 11 is located at an outlet end 33 thereof, to receive a supply of air in a first section 31 thereof, and to receive a supply of exhaust gas from the exhaust gas supply arrangement 20 in a second section 32 thereof, the second section 32 being closer to the outlet end 33 than the first section 31. Especially in FIG. 3, it can be seen how the exhaust gas supply channels 22, 23, 24, 25 constitute discrete paths for multiple circumferentially located injection areas on the main channel 30. At the very positions where the exhaust gas supply channels 22, 23, 24, 25 are connected to the main channel 30, the main channel 30 is provided with inlet openings 34, as can be seen in FIGS. 5-9.

In the shown practical embodiments of the air/gas supply system 100, the exhaust gas supply channels 22, 23, 24, 25 extend towards the positions on the main channel 30 where the inlet openings 34 are present, which positions are different positions in the peripheral direction of the main channel 30 and are at the same level in the axial direction of the main channel 30. The exhaust gas supply channels 22, 23, 24, 25 have a flattened cross-section shape, and the inlet openings 34 on the main channel 30 are shaped like elongated slots, which does not alter the fact that the shapes as mentioned may be chosen differently.

Further, in the shown practical embodiments of the air/gas supply system 100, the exhaust gas supply arrangement 20 is connected to the main channel 30 at ends of the exhaust gas supply channels 22, 23, 24, 25, as explained, wherein each of the exhaust gas supply channels 22, 23, 24, 25 debouches directly into the main channel 30 and thereby enables direct injection of an exhaust gas flow in air flowing through the main channel 30 towards the outlet end 33 thereof without first mixing with an exhaust gas flow of any of the other exhaust gas supply channels 22, 23, 24, 25 during operation of the air/gas supply system 100.

A portion of the air/gas supply system 100 can be incorporated in a cover component 13 of the compressor 10 so that a compact configuration with a minimum of separate parts can be obtained. In this respect, especially FIG. 4 serves to illustrate how such a cover component 13, the main channel 30 and the exhaust gas supply arrangement 20 can be provided as an assembly.

The main channel 30 may be provided with a fluid contracting section 35, which is a section in which the cross-section of the main channel 30 decreases as seen in flow direction F. At the position of the fluid contracting section 35, acceleration of the fluid flow is obtained. The invention covers different possible choices in respect of the position where the exhaust gas supply channels 22, 23, 24, 25 are connected to the main channel 30 relative to the position of the optional fluid contracting section 35 of the main channel 30. FIGS. 5 and 6, and also FIG. 9, illustrate the option of the position where the exhaust gas supply channels 22, 23, 24, 25 are connected to the main channel 30 being directly downstream of the fluid contracting section 35. It is also possible that the cross-section of the main channel 30 decreases at the position where the exhaust gas supply channels 22, 23, 24, 25 are connected to the main channel 30. This option is illustrated in FIGS. 7 and 8. Another feasible option is the option of the position where the exhaust gas supply channels 22, 23, 24, 25 are connected to the main channel 30 being upstream of the fluid contracting section 35.

The exhaust gas supply channels 22, 23, 24, 25 may also comprise a section 26 of decreasing cross-section in flow direction, as illustrated in FIG. 9. The section 26 may have any position on the exhaust gas supply channels 22, 23, 24, 25. In the example that is shown in FIG. 9, the position is at the connection to the main channel 30. In any case, at the position of the section 26 of decreasing cross-section in flow direction, acceleration of the exhaust gas flow is obtained.

Choosing the positions of the fluid contracting section 35 of the main channel 30 and/or the section 26 of decreasing cross-section of the exhaust gas supply channels 22, 23, 24, 25 is a way of adjusting the static pressure (and the velocity) of the exhaust gas flows at the inlet openings 34 on the main channel 30.

It follows from the foregoing that in the configuration as shown in FIG. 8, fluid contraction/acceleration and exhaust gas injection occur simultaneously in the main channel 30, while in the configuration as shown in FIG. 9, fluid contraction/acceleration occurs prior to exhaust gas injection in the main channel 30. Especially in the latter case, high stability for bulk flow disturbances (inlet bend) is expected. In any case, it may be advantageous if the position of the exhaust gas injection is close to the area 14 where the compressor wheel 11 is located. Even when a higher amount of total condensing water in the mixture of air and exhaust gas is obtained, the expected impact of the condensation on the compressor wheel 11 may still be acceptable when the position of the exhaust gas injection is closer to the area 14 where the compressor wheel 11 is located.

As can best be seen in FIG. 3, each of the exhaust gas supply channels 22, 23, 24, 25 is connected to the main channel 30 without circumferential inclination. Further, as can best be seen in FIGS. 8 and 9, each of the exhaust gas supply channels 22, 23, 24, 25 is connected to the main channel 30 with axial inclination α.

In FIG. 10, an alternative embodiment of the exhaust gas supply arrangement 20 is shown. This embodiment is different from the embodiment shown in FIG. 1 as far as the configuration at the end sections of the exhaust gas supply channels 22, 23, 24, 25 is concerned. In the alternative embodiment, the end sections of the exhaust gas supply channels 22, 23, 24, 25 are interconnected. Thus, in the alternative embodiment, the exhaust gas supply channels 22, 23, 24, 25 are separate from each other along a substantial part of their length, not along their entire length. The exhaust gas injection to be realized by means of the exhaust gas supply arrangement 20 according to the alternative embodiment is not multiple discrete while the exhaust gas supply arrangement 20 does not incorporate a conventional single or multiple scroll either. In the shown example, the interconnection of the exhaust gas supply channels 22, 23, 24, 25 is at the side of the main channel 30. In general, it may be practical if the interconnection is present downstream from a position on which a circumferential angle β of the exhaust gas flow stays between −45° and +45°.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

Notable aspects of the present invention are summarized as follows. In the technical field of compressors, a system 100 that is configured to supply a mixture of air and exhaust gas to a compressor wheel 11 of a compressor 10 is provided. The system 100 comprises a main channel 30 that is configured to debouch into an area 14 where the compressor wheel 11 is located at an outlet end 33 thereof, to receive a supply of air in a first section 31 thereof, and to receive a supply of exhaust gas in a second section 32 thereof that is closer to the outlet end 33 than the first section 31, and an exhaust gas supply arrangement 20 that is connected to the main channel 20 at the position of the second section 32. The exhaust gas supply arrangement 20 is designed as a distributor comprising at least two exhaust gas supply channels 22, 23, 24, 25 which are separate from each other along at least a substantial part of their length.

REFERENCE LIST 100 air/gas supply system
10 compressor
11 compressor wheel
12 outlet pipe of the compressor
13 cover component of the compressor
14 area where the compressor wheel is located
20 exhaust gas supply arrangement
21 central (exhaust gas) inlet channel
22 exhaust gas supply channel
23 exhaust gas supply channel
24 exhaust gas supply channel
25 exhaust gas supply channel
26 section of decreasing cross-section
30 main channel
31 first section of the main channel
32 second section of the main channel
33 outlet end of the main channel
34 inlet opening on the main channel
35 fluid contracting section
α axial inclination of the exhaust gas supply channels
β circumferential angle of the exhaust gas flow

The invention claimed is:

1. A system configured to supply a mixture of air and exhaust gas to a compressor wheel of a compressor, the system comprising:
   a main channel that is configured to debouch into an area where the compressor wheel is located at an outlet end thereof, to receive a supply of air in a first section thereof, and to receive a supply of exhaust gas in a second section thereof that is closer to the outlet end than the first section, and
   an exhaust gas supply arrangement that is connected to the main channel at the position of the second section,
   wherein the exhaust gas supply arrangement comprises a central inlet channel duct and at least two exhaust gas supply channel ducts attached to the central inlet channel duct which are separate from each other along at least a part of their length,
   wherein the exhaust gas supply arrangement is connected to the main channel at ends of the exhaust gas supply channels, and
   wherein each of the exhaust gas supply channels debouches directly into the main channel and thereby enables direct injection of an exhaust gas flow in air flowing through the main channel towards the outlet end thereof without first mixing with an exhaust gas flow of any other exhaust gas supply channel during operation of the system.

2. The system according to claim 1, wherein the exhaust gas supply channels extend towards different peripheral positions on the main channel.

3. The system according to claim 1, wherein the central inlet channel is configured to receive a supply of exhaust gas at a position upstream of the exhaust gas supply channels.

4. The system according to claim 1, wherein each of the exhaust gas supply channels is connected to the main channel at an incline with respect to an axial direction of the main channel, and/or each of the exhaust gas supply channels is connected to the main channel without any circumferential inclination.

5. The system according to claim 1, wherein the exhaust gas supply channels are connected to the main channel at the same position in the axial direction of the main channel.

6. The system according to claim 1, wherein each of the exhaust gas supply channels comprises a section of which the cross-section decreases in flow direction through the respective exhaust gas supply channel.

7. The system according to claim 1, wherein each of the exhaust gas supply channels comprises a section of which the cross-section decreases in flow direction through the respective exhaust gas supply channel and that is at a position of an end of the exhaust gas supply channel at a side of the main channel.

8. The system according to claim 1, wherein the exhaust gas supply channels have a flattened shape in view of a cross-section, along at least a part of their length.

9. The system according to claim 1, wherein the cross-section of the main channel decreases as seen in flow direction through the main channel in an area of the main channel where the exhaust gas supply arrangement is connected to the main channel.

10. The system according to claim 1, wherein the cross-section of the main channel decreases as seen in flow direction through the main channel in an area of the main channel that is either upstream or downstream of the position where the exhaust gas supply arrangement is connected to the main channel.

11. The system according to claim 1, wherein the main channel is composed of at least two separate parts joined together.

12. The system according to claim 1, wherein the exhaust gas supply arrangement comprises at least one coupling area that is configured to couple a bypass valve channel of the compressor to the exhaust gas supply arrangement.

13. The system according to claim 1, wherein at least a portion of the exhaust gas supply arrangement of the system is integrated in a component configured to be used as a cover component of the compressor.

14. An assembly of a turbocharger and a system according to claim 1.

15. An exhaust gas supply arrangement configured to be used in a system that is configured to supply a mixture of air and exhaust gas to a compressor wheel of a compressor, wherein the exhaust gas supply arrangement is formed as a single-piece and comprises:
a central inlet channel duct and at least two exhaust gas supply channel ducts attached to the central inlet channel duct which are separate from each other along at least a part of their length,
wherein the exhaust gas supply arrangement is configured to be connected to a main channel at ends of the exhaust gas supply channels such that each of the exhaust gas supply channels debouches directly into the main channel and thereby enables direct injection of an exhaust gas flow in air flowing through the main channel without first mixing with an exhaust gas flow of any other exhaust gas supply channel during operation of the system.

16. A method of supplying a mixture of air and exhaust gas to a compressor wheel of a compressor, the method comprising:
providing an air flow and directing the air flow towards an area where the compressor wheel is located, and
providing exhaust gas and injecting the exhaust gas in the air flow at an injection position on the air flow,
wherein the exhaust gas is provided in at least two separate exhaust gas flows via at least two exhaust supply channel ducts, respectively, extending from the central inlet channel duct, which are directed towards the injection position on the air flow from different sides of the airflow,
wherein the exhaust gas supply arrangement is connected to a main channel at ends of the exhaust gas supply channels, and
wherein each of the exhaust gas supply channels debouches directly into the main channel and thereby enables the injecting the exhaust gas flow in the air flow, which flows through the main channel towards an outlet end thereof without first mixing with an exhaust gas flow of any other exhaust gas supply channel.

17. The method according to claim 16, wherein the separate exhaust gas flows are obtained by separating a single supply exhaust gas flow.

18. A method of manufacturing a system configured to supply a mixture of air and exhaust gas to a compressor wheel of a compressor, the method comprising:
providing a main channel and arranging the main channel to debouch into an area where the compressor wheel is located at an outlet end thereof, and
providing an exhaust gas supply arrangement that comprises a central inlet channel duct and at least two separate exhaust gas supply channel ducts, extending from the central inlet channel, which are separate from each other along a part of their length, and connecting the exhaust gas supply arrangement to the main channel at ends of the exhaust gas supply channels, and
wherein each of the exhaust gas supply channels debouches directly into the main channel and thereby enables direct injection of an exhaust gas flow in air flowing through the main channel towards an outlet end thereof without first mixing with an exhaust gas flow of any other exhaust gas supply channel during operation of the system.

19. The method according to claim 18, wherein the at least two exhaust gas supply channels are connected to the main channel at different peripheral positions on the main channel.

20. The method according to claim 18, wherein providing the main channel comprises providing and joining together at least two separate parts.

* * * * *